March 24, 1931. C. MEIER ET AL 1,797,991
TAPERING ATTACHMENT FOR MACHINE TOOLS
Filed Dec. 30, 1926 2 Sheets-Sheet 1
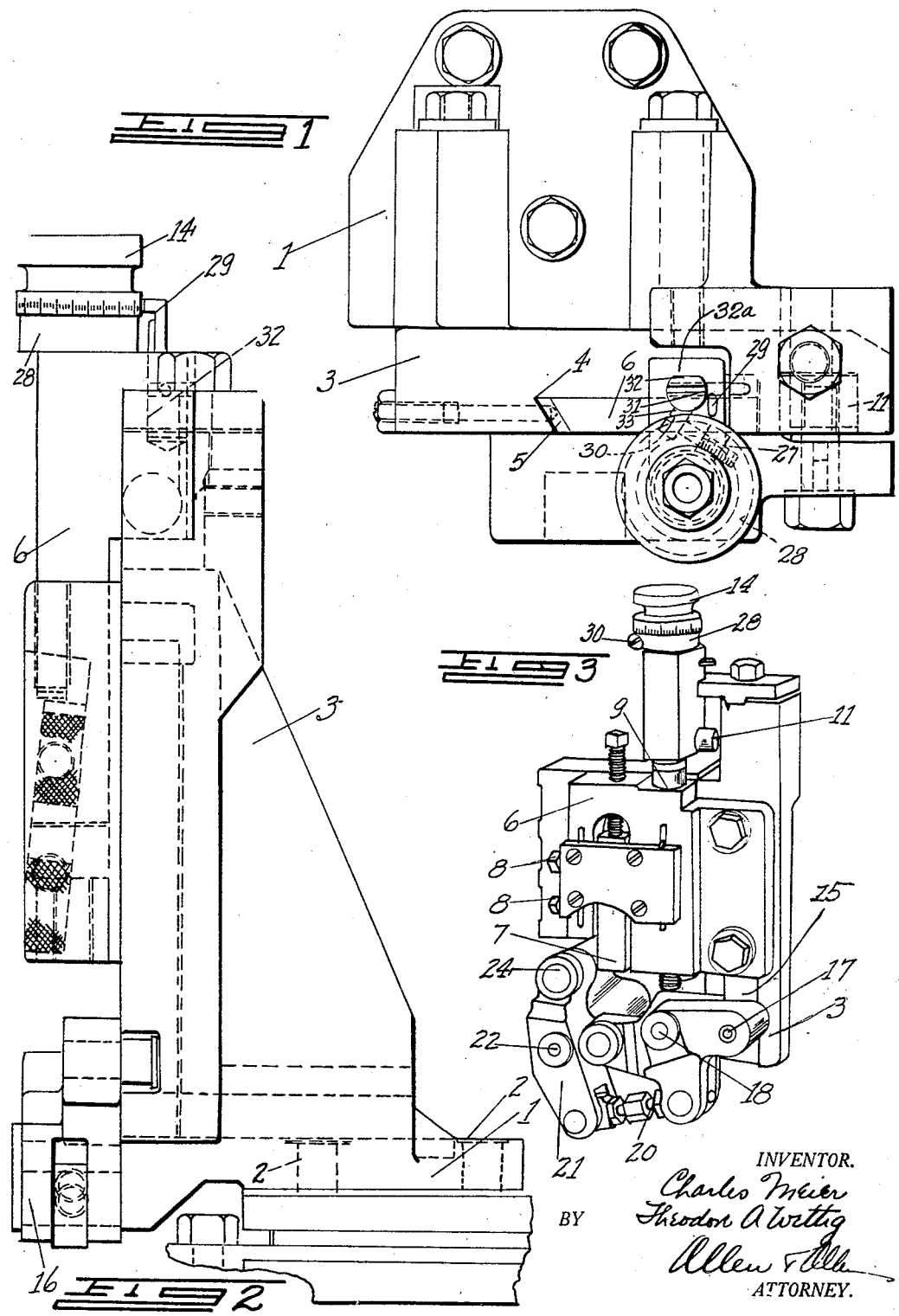
INVENTOR.
Charles Meier
BY Theodor A Wittig
Allen & Allen
ATTORNEY.

March 24, 1931.  C. MEIER ET AL  1,797,991
TAPERING ATTACHMENT FOR MACHINE TOOLS
Filed Dec. 30, 1926  2 Sheets-Sheet 2
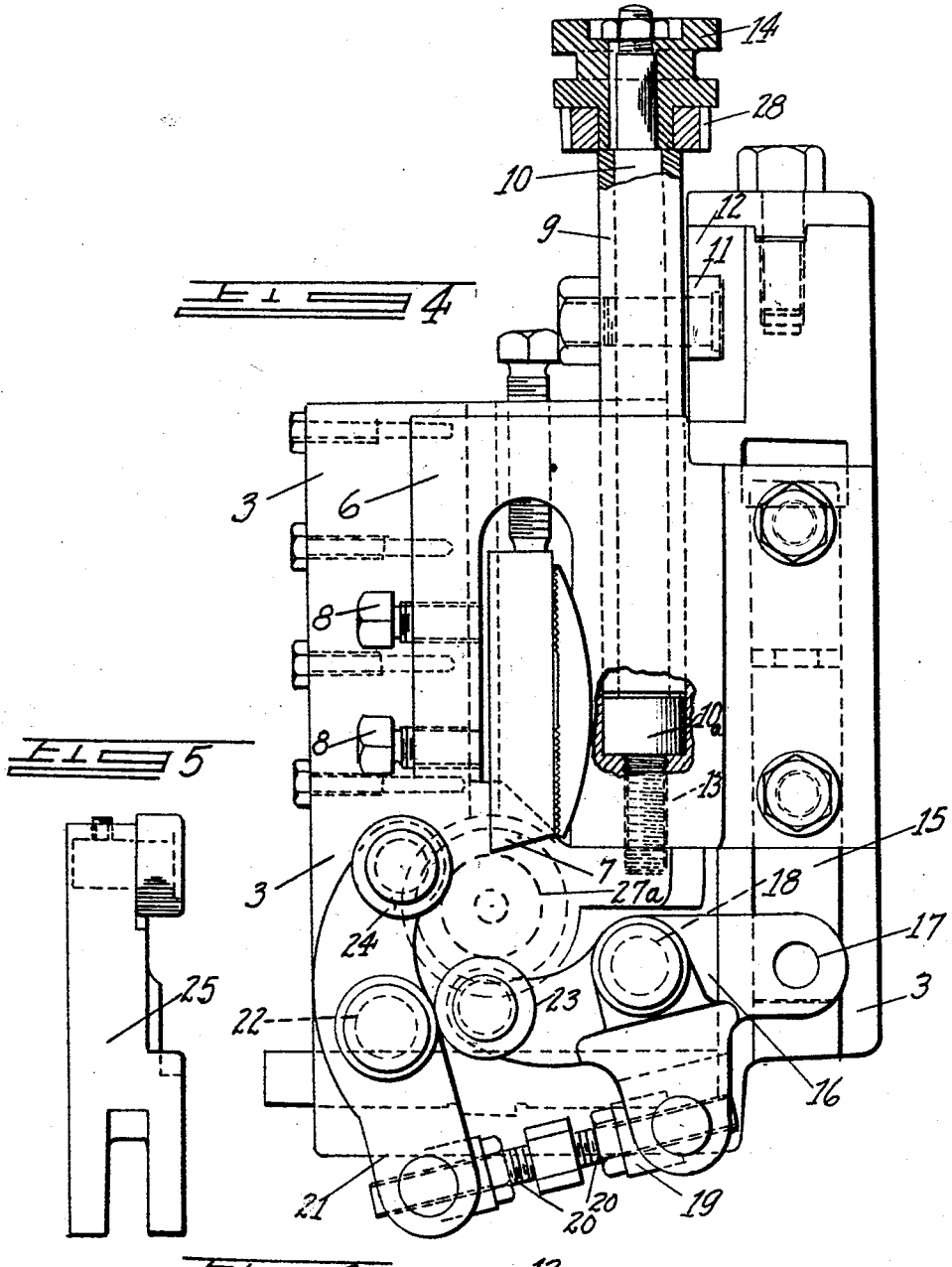
INVENTOR.
Charles Meier
Theodor A. Wittig
BY
Allen & Allen
ATTORNEY.

Patented Mar. 24, 1931

1,797,991

UNITED STATES PATENT OFFICE

CHARLES MEIER AND THEODORE A. WETTIG, OF CINCINNATI, OHIO, ASSIGNORS TO THE ACME MACHINE TOOL COMPANY, OF CINCINNATI, OHIO, A CORPORATION OF OHIO

TAPERING ATTACHMENT FOR MACHINE TOOLS

Application filed December 30, 1926. Serial No. 158,084.

Our invention relates to a machine tool for taper turning work, particularly in combination with a lathe. Our invention further relates to a machine for supporting a work cutting tool and guiding it with relation to a piece of work rotated in a lathe chuck.

It is the object of our invention to provide a machine tool combination which is provided with adjustable means for controlling the position of a turning tool, so as to effect a tapered cut with auxiliary mechanism connected with the means for controlling the position of the work and burnishing it, which is regulated and controlled by the mechanism for governing the work cutting tool.

In the art there are several structures which have a similar function, and it is our object to reverse the principle of operation of such machines so as to insure a greater degree of accuracy in taper turning work. In taper turning devices now known and used, guide rollers for supporting and burnishing a piece of work consisting of metal rollers, have been frequently employed. Devices have also been used which have an auxiliary tool holder, the position of which is co-operatively regulated by the guiding and burnishing rollers.

We have as a prime object in our machine the provision of an accurately controlled tool holder which will operate on work with or without the co-operation of supporting and burnishing rollers. In metal lathes a piece of work to be tapered, usually a metal bar is secured in the lathe chuck and then rotated. The cutting tool, being under what we might call an initially regulated mechanism, may be thus regulated with a greater degree of nicety than has heretofore been possible, and slight variations due to wear, if guiding and burnishing rollers are also used, will not cause inaccuracies.

It is further our object to provide improvements in mechanism for regulating the position of the tool holder, which greatly facilitates setting the mechanism for repeated operations of a similar nature.

Referring to the drawings in which we have shown a preferred combination:

Figure 1 is a plan view of the machine assembly.

Figure 2 is a side elevation of the machine.

Figure 3 is a perspective view of the tool assembly with the slotted taper bar or cam guide removed from place.

Figure 4 is a front elevation with the position of a piece of work to be tapered shown in dotted lines.

Figure 5 is an end elevation of a supporting device for a master slotted guide member used in combination with the taper turning machine.

Figure 6 is a perspective view of a master slotted taper bar or cam guide.

The machine has a base 1 which may be bolted or otherwise attached to the metal lathe frame as indicated at 2 in Figure 2. Extending upwardly from the base 1, we have provided a supporting frame 3 which is preferably rigidly mounted on the base. While it is usual practice to rotate work in a lathe chuck and move the carriage in which the tool is carried so as to advance along the work, there is no reason why our tapering machine should not be mounted on a fixed part of the lathe and the work fed along with relation to the tool.

The frame 3 is dovetailed as indicated at 4 with a gib 5, which bears against a sliding member 6 in which the cutting tool, which may be of the kind indicated at 7, is mounted and held in position as by the adjustment bolts 8. Extending upwardly from within the sliding member 6 is a casing portion 9 within which a rotatable screw 10 is mounted. This screw 10 has an enlarged shoulder portion 10a against which the casing 9 bears. This permits the slide block 6 to be moved up and down while the casing 9 is held in a relatively fixed position with the supporting guide roller 11 in the slotted member 12. Secured to the casing 9 is a guide member such as the roller 11 which slides within a master taper slotted bar 12 which is usually carried in the same portion of the lathe as the chuck, so that as the tapering attachment is advanced, the master cam member raises and lowers the roller 11, thereby carrying the slide 6 with the cutting tool to the various positions as required for the correct tapering of the work. The screw 10 is threaded within a nut 13 which is fixedly retained in the slide 6. A hand wheel 14 is fixedly secured to the upper end of the screw 10, and as the slide 6 is carried by the screw 10 when the hand wheel 14 is rotated the elevation of the slide 6 with relation to the frame of the machine is thereby controlled. There is an auxiliary slide member 15 which is connected with the slide 6. A rocker arm 16 is pivotally connected with the slide 15 as indicated at 17. The rocker is journaled in the machine frame as shown at 18. A boss 19 extended from the rocker arm has an adjustable connection 20 with another rocker arm 21 which is journaled in the machine frame as indicated at 22. The two rocker arms carry the burnishing and guiding rollers 23 and 24 respectively, the roller 23 being mounted in the rocker 16 and the roller 24 in the rocker 21. As the slide 15 is elevated and lowered either with the rotation of the screw hand wheel 14 or with the movement of the roller 11, the rollers 23 and 24 move radially to and from a central axis which is the predetermined axis of the work which is to be tapered.

We have shown in Figure 4 a supporting mechanism 25 for carrying the master taper guide bar. A suitable type of master guide bar 12 is indicated in Figure 6.

The operation of the machine is as follows: The work to be turned in the lathe with a taper, which in Figure 4 is indicated at 27a, is mounted in the lathe chuck and extended within the opening between the guiding and burnishing rollers and the cutting tool. The master taper guide bar is then inserted within the slot in the machine frame enclosing the roller 11. The lathe is then started and the hand wheel 14 turned to such a position that the tool engages the work. As the lathe moves the tapering attachment with relation to the work, the guide roller 11 gradually lowers or elevates the slide to determine the taper of the work in accordance with the predetermined slot in the master bar.

Supposing that the work to be done consists in a lot of tapered rods three feet in length tapered from a peripheral diameter of two inches at one end and one-half inches at the other. The slot in the master bar will thus be inclined one quarter inch during its length of three feet. The hand wheel is provided with a set screw 27 which may be used to fix the screw 10 with relation to a rotatable collar 28. The periphery of hand wheel preferably has calibrations on it registering with a pointer as indicated at 29. From the collar a lug head 30 of the screw 27 extends, which at a certain position in a rotary movement of the hand wheel carrying the collar, will engage a half round segment 31 of a stop rod 32. When the cutting tool is first moved into engagement with the bar to be tapered, the hand wheel is locked on the collar in the position in which the lug engages the half round segment of the stop rod. The rotation of the stop rod to expose its flattened side 32a allows the screw head 30 to clear, and tapering can be continued beyond a predetermined point. The position of the calibration may then be taken. The hand wheel may then be turned counter-clockwise at any desired time and it can always readily be moved back to the previously calibrated position and into engagement with the stopping device as noted.

If it is desired to taper a different lot of bars of three feet in length with a diameter at one end of two and one sixty-fourths inches, and at the other of one and thirty-three sixty-fourths inches, the same master taper bar may still be used and all that will be necessary will be for a rotary movement to be made of the calibrated hand wheel to a slightly different calibration. Then when the lot of oversized bars is run, the operator can return to the original setting at which the set screw engages the thumbscrew segment. The stopping device also avoids the necessity of accurate observation of the calibration on given jobs for each operation.

It will thus be apparent that we have provided an adjustable regulating control which may be set at a certain position, and which may without disturbing the set position, be regulated for oversize or undersize tapering operations. This, to the best of our knowledge and belief, is a novel arrangement, and one which enables much greater efficiency in the operation of the machine without repeated adjustments.

Modifications in the arrangement which we have shown in the specific structure disclosed will readily occur to those skilled in the art, without departing from the principle involved.

Having thus described our invention, what we claim as new and desire to secure by Letters Patent, is:—

1. In a taper turning attachment for a lathe, a support, a tool carrying device thereon, comprising a sliding member having an extended portion, a guide member on said extended portion connected directly with said tool carrying device, and a guide bar having a slot so disposed therein as to provide predetermined tapering guidance adapted to enclose said guide member on three sides, manually adjustable means for guide rollers, pivoted supports therefor and connections between the supports and the tool supporting slide for moving the guide rollers in arcs toward and from the axis of the work to guide and support it.

2. In a taper turning attachment for a lathe, a support, a tool carrying device thereon, and a sliding member having an extended portion, a guide roller on said extended portion directly connected with said tool carrying device, and a guide bar having a slot so disposed therein as to provide predetermined tapering guidance adapted to enclose said guide member on three sides, and manually adjustable means for moving said tool carrying device on said sliding member, guide rollers, pivoted supports therefor and connections between the supports and the tool supporting slide for moving the guide rollers in arcs toward and from the axis of the work to guide and support it, said manually adjustable means having visible indicia for indicating its position, and adjustable blocking means for limiting the adjustment thereof to a predetermined visibly indicated position.

3. A taper turning device comprising in combination, framework members, a slide mounted in said framework members, a tool holding device carried by said slide, said tool holding device adjustably mounted in said slide, and means for regulating the position of said tool holding device with relation to said slide, and guiding means operatively connected to said slide, guide rollers, pivoted supports therefor and connections between the supports and the tool supporting slide for moving the guide rollers in arcs toward and from the axis of the work to guide and support it.

4. A taper turning device comprising in combination, framework members, a slide mounted in said framework members, a tool holding device carried by said slide, said tool holding device adjustably mounted in said slide, and means for regulating the position of said tool holding device with relation to said slide, guiding means operatively connected to said slide, and auxiliary mechanism operatively connected with said slide arranged to provide a peripheral guide to work carried in position adapted to be operated on by a tool supported in said tool holding device, comprising guide rollers mounted for movement in arcs toward and from the axis of the work to guide and support it, guiding rollers movable simultaneously in arcs toward the axis of work guided thereby.

5. A taper turning device comprising in combination, framework members, a slide mounted in said framework members, a tool holding device carried by said slide, said tool holding device adjustably mounted in said slide, and means for regulating the position of said tool holding device with relation to said slide, and guiding means operatively connected to said slide, and auxiliary mechanism operatively connected with said slide, arranged to provide a peripheral guide to work carried in position adapted to be operated on by a tool supported in said tool holding device, said auxiliary mechanism comprising guiding and burnishing rollers mounted on interconnected rocker arms, and the operative connection with said rollers, being such that said regulating means will move said rollers arcuately with relation both to each other and to the axis of said tool holding device.

6. A tapering device for a machine tool comprising in combination with a grooved bar, framework members, a slide in said framework members, a tool holding device carried thereby, said slide having a rotatable connection with said tool holding device, said tool holding device adjustably mounted in said slide, and means of regulating the connection with said tool holding device, whereby the relative position of said tool holding device and said slide is controlled, and guiding means in combination with said grooved bar controlling the position of said slide, and auxiliary means for supporting work comprising at least two guiding and burnishing rollers, and rockers carrying said rollers the movement of one of which controls the movement of the other to move said rollers in an arc toward the axis of work held by said rollers.

7. In a taper turning mechanism, a support, tool holding means slidably connected with said support, and means for regulating the position of said tool holding means on said support, said regulating means comprising a member having a shaft rotatably mounted therein, and a rotatable handle on said shaft for controlling the position of said tool holding means in said member, said member having a guide member extending therefrom directly connected with said tool holding means, said handle having calibrations thereon, and a fixed pointer for indicating the position of the calibrated portion of said handle, and a member movable to a position to block the free rotation of said handle, whereby calibrated positions of handle may be set for a series of operations of said mechanism.

CHARLES MEIER.
THEODORE A. WETTIG.